US010924995B2

(12) United States Patent
Patwardhan et al.

(10) Patent No.: US 10,924,995 B2
(45) Date of Patent: Feb. 16, 2021

(54) WAKE-UP RADIO ROAMING

(71) Applicant: HEWLETT PACKARD ENTERPRISE DEVELOPMENT LP, Houston, TX (US)

(72) Inventors: Gaurav Patwardhan, Santa Clara, CA (US); Eldad Perahia, Park City, UT (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 149 days.

(21) Appl. No.: 16/135,767

(22) Filed: Sep. 19, 2018

(65) Prior Publication Data
US 2020/0092804 A1    Mar. 19, 2020

(51) Int. Cl.
*H04W 52/02* (2009.01)
*H04W 8/00* (2009.01)
*H04W 72/04* (2009.01)
*H04W 88/06* (2009.01)

(52) U.S. Cl.
CPC ....... *H04W 52/0216* (2013.01); *H04W 8/005* (2013.01); *H04W 52/0229* (2013.01); *H04W 72/0446* (2013.01); *H04W 88/06* (2013.01)

(58) Field of Classification Search
CPC ..... H04B 1/1615; G06F 1/3203; H04L 27/26; H04W 8/005; H04W 52/02; H04W 52/0206; H04W 52/0212; H04W 52/0216; H04W 52/0219; H04W 52/0229;
(Continued)

(56) References Cited

U.S. PATENT DOCUMENTS

| 9,055,530 B2 | 6/2015 | HomChaudhuri et al. |
| 9,210,656 B2 | 12/2015 | Mannemala et al. |
| 9,439,136 B2 | 9/2016 | Park et al. |

(Continued)

FOREIGN PATENT DOCUMENTS

| WO | WO-2018038532 | 3/2018 |
| WO | WO-2018085635 | 5/2018 |

OTHER PUBLICATIONS

Roaming mechanism for duty cycle mode; Gaurav Patwardhan (HPE): "Roaming mechanism for duty cycle mode", IEEE Draft; 11-18-1009-00-00BA (Year: 2018)*

(Continued)

*Primary Examiner* — Marsha D Banks Harold
*Assistant Examiner* — Dharmesh J Patel
(74) *Attorney, Agent, or Firm* — Nolte Lackenbach Siegel

(57) ABSTRACT

This disclosure is directed to controlling a wake-up radio (WUR) in a wireless station side client device (STA-device). In one example, after the STA-device has received negotiation parameters from a wireless access point (AP) to establish a wireless association as a network connection between the STA-device and the AP. The PCR may be disabled in favor of the WUR. The WUR, which may use less power than the PCR, may then monitor for Beacon Frames (e.g., in the disclosed beacon loop) and Discovery Frames (e.g., in the disclosed discovery loop). Based on a state machine, that may be implemented as computer instructions executed by a hardware processor of the STA-device. Generally, the STA-device may use the WUR and state machine implementation to determine a proper time to re-enable the PCR for communication with the AP.

20 Claims, 9 Drawing Sheets

(58) Field of Classification Search
CPC ......... H04W 52/0235; H04W 72/0446; H04W 84/12; H04W 88/06; Y02D 70/00; Y02D 70/142
See application file for complete search history.

(56) References Cited

U.S. PATENT DOCUMENTS

2014/0233443 A1    8/2014  Kumar
2018/0249412 A1*   8/2018  Zhou et al.

OTHER PUBLICATIONS

Donald Eastlake, "A CSD Proposal for Wake-up Radio (WUR)", doc.: IEEE 802.11-12/1077r04, Huawei Technologies, Jul. 24, 2016, 6 pages.

Minyoung Park, "A PAR Proposal for Wake-up Radio", IEEE P802.11, Wireless LANs, Jul. 28, 2015, 5 pages.

Minyoung Park, "Proposal for Wake-Up Receiver (WUR) Study Group", IEEE 802.11-16/0722r1, Intel Corporation, May 2016, 14 pages.

Robert Stacey, "Specification Framework for TGba", IEEE 802.11-15/0132r1511, Intel, Mar. 26, 2018, 18 pages.

Ross Jian Yu, "WUR Usage Model Document", Huawei Technologies, IEEE 802.11-17/0029r10, Sep. 13, 2017, 23 pages.

Nan, L. et al., Advertising WUR Discovery Frame Related Info for Fast Scanning, (Research Paper), Feb. 11, 2018, 13 Pgs.

Park, H. et al., Wake-up Radio-resilient Scanning Mechanism for Mobile Device in IEEE 802.11ba, (Research Paper), Apr. 6, 2018, May 21, 2018, 1 Pg.

Extended European Search Report received for EP Patent Application No. 19197711.5, dated Jan. 7, 2020, 8 pages.

Patwardhan et al., "Roaming mechanism for duty cycle mode", vol. 882.11ba, May 13, 2018, 17 pages.

* cited by examiner

WAKE-UP RADIO ROAMING

BACKGROUND

Today, many internet of things (IoT) devices are available to communicate over a network and provide status, control capability, and other metrics over the network. For example, a smart home may include many devices that may be in communication with and controlled by an end-user device such as a laptop or smartphone. More and more devices are becoming network aware and a large portion of those devices are connected via a wireless network such as WiFi®. Some devices may have a dedicated wireless connection but installation of a wired network to each of these devices may introduce unnecessary complications. Further, many of the types of devices that are becoming network aware via a wireless network connection do not typically have access to a direct (e.g., wired) power source and are therefore powered with batteries. Accordingly, power consumption and power optimization may be important operational factors for wirelessly connected devices.

To address power consumption and other concerns, the IEEE 802.11 Working Group started a Task Group "TGba" for creating an amendment to the IEEE 802.11 standard focusing on standardizing a specification for a Wake-Up Radio (WUR). This standard is intended to address certain use cases where a device may be mobile and move from one network to another (e.g., connect to different access points (APs) as it moves geographically) also referred to as "roaming" in this disclosure. The use cases examples are primarily IoT solution based and generally address scenarios where the IEEE 802.11 radio has to be in deep sleep state with minimal power consumption. The WUR is a station side (STA) companion radio to the main IEEE 802.11 radio (also known as Primary Communication Radio or PCR). A mobile device and other devices that connect to an AP (e.g., to gain access to a network) are referred to as STA devices. The WUR typically operates in an receive (Rx) only mode and consumes low power relative to the PCR. One reason for power savings for the WUR when compared to PCR is because the WUR operates in only 4 MHz of bandwidth. The WUR is basically designed to wake-up the PCR on the STA when it receives the Wake-Up Packet. Thus, increasing the power consumption on the STA device when it actually needs to communicate on the network using the PCR and allow the device to conserve power when not actively communicating by allowing the WUR to monitor for wake-up indications.

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not require serial processing and therefore may be performed in an order different than shown or possibly in parallel with each other. For a detailed description of various examples, reference will now be made to the accompanying drawings, in which.

DETAILED DESCRIPTION

Figure 1:
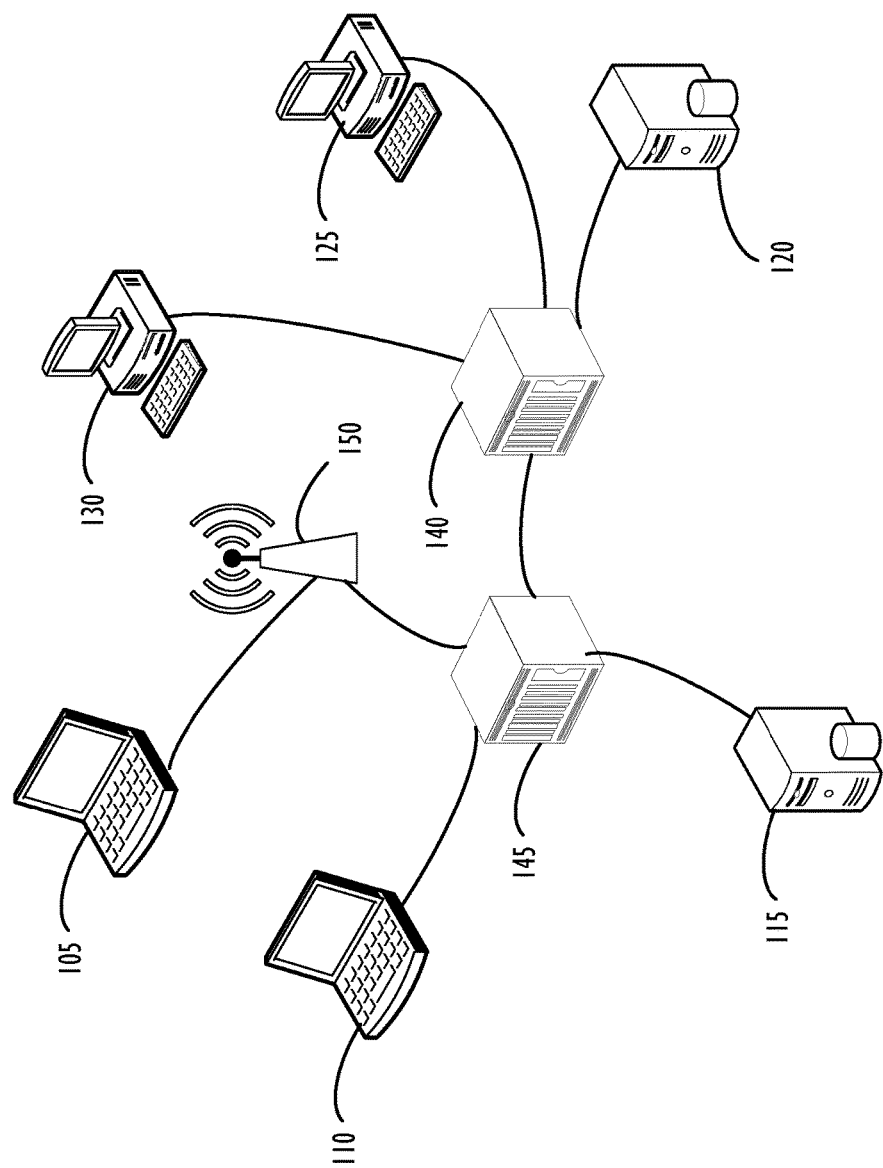
FIG. 1 is a functional block diagram representation of a network including six individual nodes connected to two switches that are connected together, and includes a wireless access point for WIFI connection to the network.

Examples of the subject matter claimed below will now be disclosed. In the interest of clarity, not all features of an actual implementation are described in this specification. It will be appreciated that in the development of any such actual example, numerous implementation-specific decisions may be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Disclosed implementations address issues involved with techniques to perform functions upon a station not waking up and actions to take to ensure that a station properly attempts to reconnect with an access point. Multiple different use cases are addressed in this disclosure. One example disclosed use case includes an IoT use case for asset tracking. Asset tracking is a technique to associate a wireless device with an asset and track attributes of that asset. Attributes may include location of the asset and may also include other sensor measurements or operating characteristics of that asset (e.g., temperature, humidity, etc.).

The following list of acronyms may be used throughout this disclosure and corresponding FIGS.

| | |
|---|---|
| WUR | Wake-Up Radio |
| WUP | Wake-Up Packet |
| AP | Access Point - a Wi-Fi router or hot-spot that allows devices to connect to a network |
| STA | Station that connects to an access point (AP) via a network association when in range |
| IoT | Internet of Things |
| WUR-STA | Wake-Up Radio Station |
| PCR | Primary Communication Radio |
| TSF | Timing Synchronization Function |
| BSS | Basic Service Set |
| WID | Wake-UP ID - An STA ID analogous to a MAC address in traditional IEEE 802.11 |
| GID | Group ID - An ID given to a group of WUR STAs |

As mentioned above, a WUR may be to conserve power on a device with a Wi-Fi communication capability. An IoT device may or may not have a direct source to power and may rely on a battery (e.g., with a limited amount of power). Power consumption reduction techniques may assist in extending the operational period of an IoT device, in part, because reduction in power consumption may extend the time a battery charge may be maintained at an operational level. Some current implementations of IoT asset tagging are based on Bluetooth technology and a Wi-Fi asset tag may provide additional capabilities (e.g., extended communication range) over Bluetooth implementations. Current models of the communication specification (e.g., the IEEE 802.11 Specification) allow the duty cycle (time when in low power mode versus full power mode) to be determined by the client device. Some of the use cases for which the standard has been defined address use cases where the STAs are assumed to be roaming with respect to the APs (e.g., how the AP handles roaming clients). The specification does not mandate how the STAs behave when roaming. Correspondingly, if the client device (station side device) is configured with a duty cycle that is too long the AP may not be able to wake-up the IoT device in a prompt manner for certain implementations (e.g., an asset tagging model). This disclosure addresses certain circumstances (e.g., the use cases and state machine described below) when an IoT device (or other device) may be instructed to try to connect with the overall system implementation in question (e.g., an asset tagging and tracking system) via an AP.

One issue with Bluetooth, as opposed to disclosed implementations of a WIFI based WUR technique for asset tagging, is that a Bluetooth device may repeatedly send out "chirps," or other types of beacons, so that the asset may be tracked by triangulating a location of these beacon signals. These constant communications may drain the associated battery. In contrast, the WUR is a receive only radio that listens for an AP and does not send out power draining signals. However, because a WUR is receive only, care should be taken to not lose track of a device within a given deployment (e.g., the WUR does not wake-up for extended periods and the asset is relocated during this extended period). Accordingly, implementations may need to determine a worst case bound on deciding the state of a given asset (e.g., with respect to communication). The disclosed state machine describes actions of a WUR (and corresponding PCR) to create a mechanism to have the asset perform actions based on loss of certain types of packets (e.g., Discovery and Beacon packets). Specifically, if packets of one type are lost, perform a first action, and if packets of another type are lost, perform a second action. The action to perform may be determined based on a current state of a device that takes into accounts recent states of that same device. That is, the actions may be determined based on "where" the device is with respect to the state machine model. This state machine model may provide a worst-case time bound on what to expect from that WUR and allow implementations of asset tagging (or other systems) to utilize Wi-Fi rather than other communication technologies such as radio frequency identification (RFID) and the above mentioned Bluetooth.

The WUR may use an "Always On" receive only mechanism or possibly a semi-power saving mode. Disclosed implementations also include a very low power "doze" state which may be implemented with a duty cycle mode of operation. In contrast to some implementations that use a single frame (typically a Beacon) for TSF as well as BSS discovery, disclosed implementations may use a WUR that works in a receive only duty cycle mode with Beacon and Discovery frames used for TSF and BSS discovery purposes respectively. Each of the different types of frames may possibly be sent on a different channel by the AP. This is illustrated in the disclosed state machine (discussed below with respect to FIGS. 5A-5B) for determining interaction of an STA device with an AP device.

Having the above understanding of station side devices configured with a WUR, a PCR, and an AP that may periodically initiate communication with a station side client device by waking it up for full network communication, a detailed implementation example is explained below with reference to the FIGS. This example implementation uses a state machine as might be used in an asset tagging implementation, however, other types of implementations that require enhanced power savings may also benefit from the techniques of this disclosure. For example, some devices in a smart home may not have access to a direct power source and therefore utilize battery power. These types of devices may not perform time-critical operations and therefore may utilize the disclosed power savings implementations to achieve desired functionality. One example would be a smart home window blind controller where shades may be lowered on demand or based on a temperature change. Clearly, this type of action may not need to be performed immediately upon request and a delay of a few seconds (or minutes) may be acceptable.

Referring now to FIG. 1, a functional block diagram of network 100 including nine individual network nodes (of different device types) including two switches and a wireless AP that are communicatively connected together. In this example, there are both wired and wireless devices. Computer lap-tops 105 and 110 represent an example of end-user devices that may be connected to computer network 110 in various ways. For example, computer lap-top 105 connects to network 100 of FIG. 1 via wireless access point 150, for example by forming a network association as outlined in the IEEE 802.11 specification for wireless networks. In this example, computer lap-top 110 is illustrated to connect to network 100 using a direct wired connection to network switch 145. Network switch 145 is, in turn, connected to network switch 140. Any number of network switches, routers, or other network communication devices (e.g., bridges) may be used to interconnect network devices but for simplicity only two switches (145 and 140) are illustrated in FIG. 1. Server computer 115 represents a computer that may provide storage or backend application support to end-user devices. For example, for network based applications, a lap-top (e.g., 105 or 110) may present a user interface portion of an application with other processing for that same application taking place on server computer 115. Server computer 120 represents another example of a network device that may be configured as a backup to server computer 115 or as an additional server for backend application support or storage. Desktop computers 125 and 130 illustrate other examples of devices that may implement end-user computers or provide some backend application support for other devices on network 100.

Figure 2:
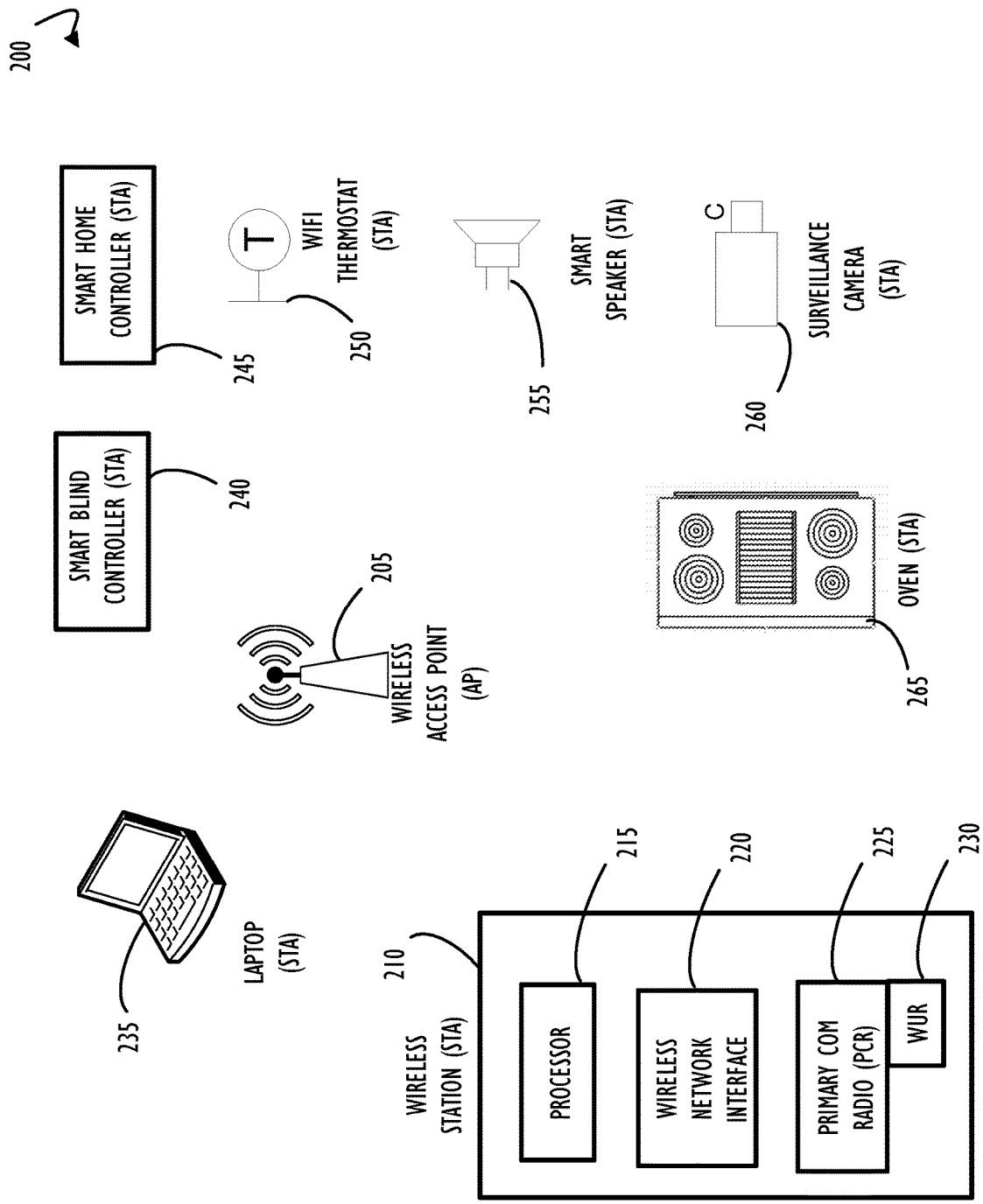
FIG. 2 is a block diagram representing possible devices that may communicate with a wireless network including possible Internet of Things devices, according to one or more disclosed implementations.

Referring now to FIG. 2, block diagram 200 represents possible examples of additional STA devices (e.g., client devices or IoT devices) that may connect to a wireless AP 205, according to one or more disclosed implementations. In the example of FIG. 2, there are STA devices that may be battery powered or have a direct source of power depending on specific implementations of those STA devices. Wireless station (STA) 210 illustrates a block diagram including base components of a client device for wireless communication in accordance with the IEEE 802.11 specification, for example. Wireless station (STA) 210 includes a processor 215 that may execute computer instructions to exchange information with other network devices, for example, the servers and other processors shown in network 100 of FIG. 1. Wireless network interface 220 represents a component to interact with the processor for communication on the network. Although illustrated as a separate component, it is possible that wireless network interface 220 is integrated as part of processor 215. Wireless station (STA) 210 also illustrates two radios including a PCR 225 and a WUR 230 as discussed above.

Each of the IoT type devices illustrated in block diagram 200 (other than AP 205) may include a wireless station (STA) 210 component to allow that device to exchange information and communicate wirelessly on a WIFI network. Laptop 235 represents a traditional network device and is included in block diagram 200 to illustrate that traditional network devices as well as IoT devices (e.g., devices not historically considered to be network enabled) may benefit from the concepts of this disclosure. From the perspective of the AP and the STA the type of device incorporating wireless station (STA) 210 may not be a determining factor in how communications take place. However, different types of wireless station (STA) 210 devices may have different implementations for how they attempt to interact with AP 205. For example, STA devices may implement low power communications with an AP based on power requirements and communication performance criteria (e.g., constant connection versus intermittent connection). Further, certain devices may alternate their configuration over time if that device may need to conserve power (e.g., during power failure, green mode operation, etc.).

Block diagram 200 includes a smart blind controller (STA) 240 that may be used to control window blinds and raise/lower the blinds based on temperature, time of day, on demand, etc. Smart home controller (STA) 245 may be a hub to interact with a number of smart home IoT devices to coordinate their actions and consolidate communication interfaces. WIFI thermostat (STA) 250 may be a network enabled thermostat to control temperature settings within a home. Smart Speaker (STA) 255 may be a network enabled speaker for a security system or a home theater system. Surveillance camera (STA) 260 may be a network enabled camera. Oven (STA) 265 may be a network enabled oven that may be turned on and off remotely at the direction of a timer or a user. These are just examples of different types of devices that have not historically been network aware but are becoming more prevalent as the IoT grows. Other devices are also possible and in general, the concepts of this disclosure may apply to any type of device requiring connection to a WIFI network.

Figure 3:
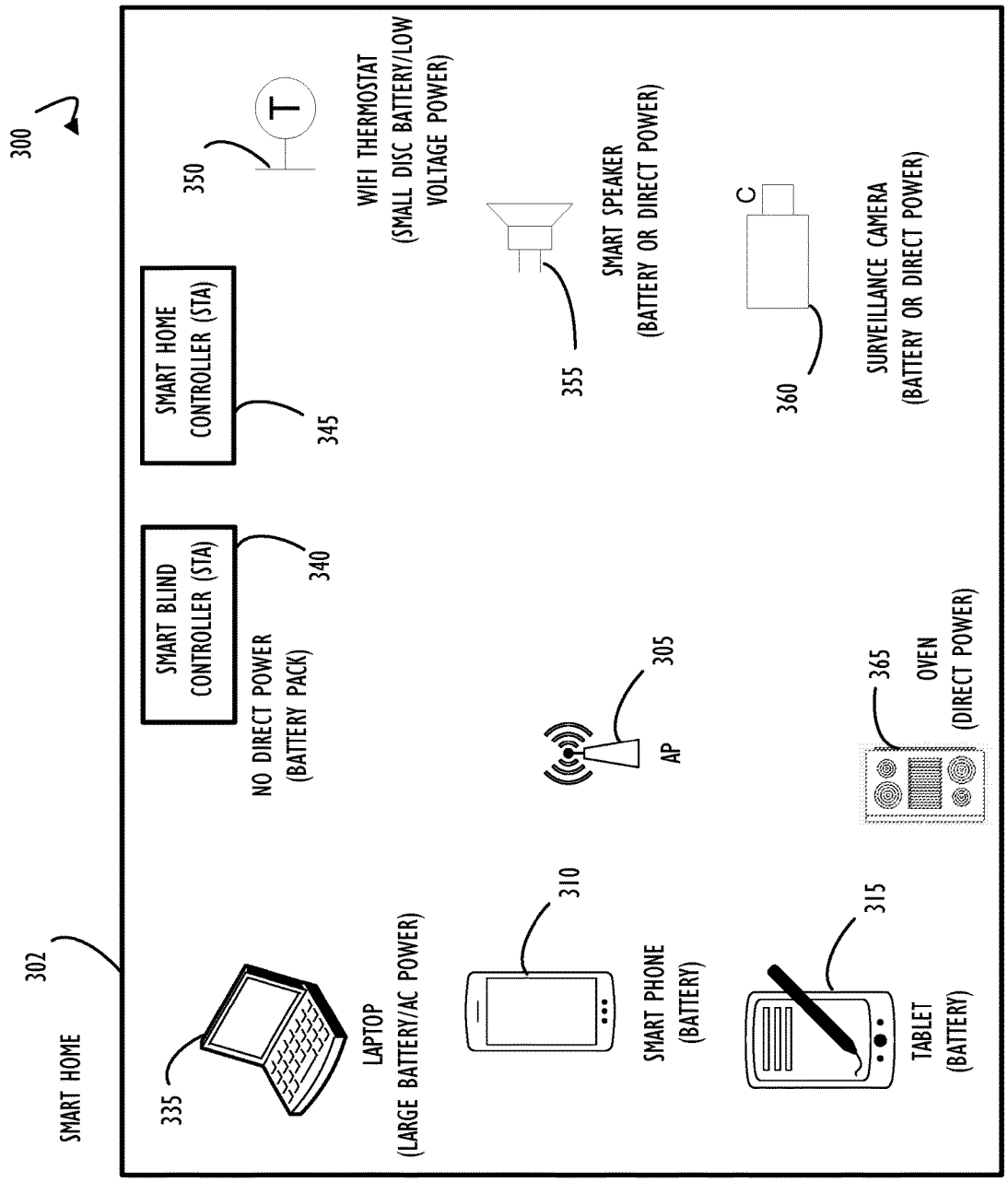
FIG. 3 is a block diagram representing one possible example of a smart home including multiple devices that may include a wake-up radio (WUR) and primary communication radio (PCR), according to one or more disclosed implementations.

Referring now to FIG. 3, block diagram 300 illustrates the devices of FIG. 2 and additional devices as they might be implemented within smart home 302 and communicate via AP 305, according to one or more disclosed implementations. Block diagram 300 includes devices that may "roam" into and out of smart home 302, such as, smart phone 310, laptop 335, and tablet 315. Other devices may be fixed in a given location and therefore not subject to roaming requirements. Further, each of the devices illustrated in block diagram 300 indicates a power type for the corresponding device. Specifically, laptop 335 may be powered with a relatively large battery or be directly connected to a power source (e.g., AC power). Smart phone 310 and tablet 315 are typically powered by a battery. Smart blind controller 340 may be typically implemented with a coin cell battery that should be expected to last for long periods of time (e.g., months to years) without replacement. Smart home controller 345 may be implemented for power in any number of ways. Wi-Fi thermostat 350 may have a low voltage power source and include battery power. Oven 365 would typically have access to a direct power source. Each of smart speaker 355 and surveillance camera 360 may be implemented with either direct power or battery. These are just examples of how certain devices may be implemented and should not be considered limiting in any way. As mentioned above, different devices may be implemented in a number of ways with respect to how they receive and use power and devices may change their power consumption model over time based on additional considerations. In general, different STA devices may have different access to power and may have different amounts of time they should operate until intervention is required (e.g., charging or changing batteries).

Figure 4:
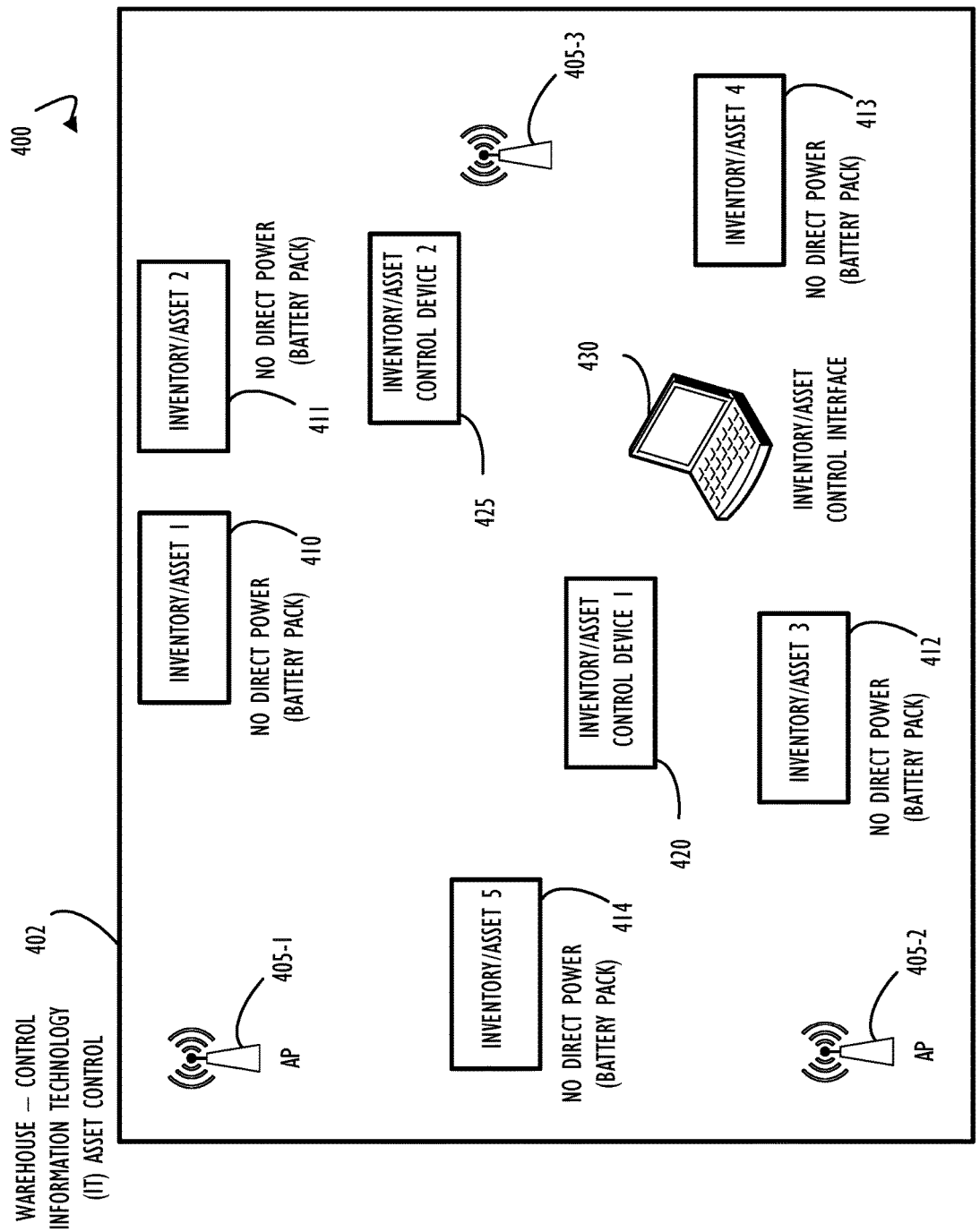
FIG. 4 is a block diagram representing one possible example of a warehouse inventory control system (or an information technology (IT) asset control system including multiple devices that may include a wake-up radio (WUR) and primary communication radio (PCR), according to one or more disclosed implementations.

Referring now to FIG. 4, block diagram 400 illustrates one possible implementation for a warehouse inventory control or an information technology (IT) asset control 402 system utilizing Wi-Fi STA devices, according to one or more disclosed implementations. To illustrate one example, block diagram 400 represents a warehouse with three different APs (405-1, 405-2, and 405-3) at different locations within the warehouse. Accordingly, triangulation between the different APs may be used to determine location and possible movement of different inventory items. Specifically, Inventory/asset 1 410 may be determined, by signal strength or no signal to be between AP 405-1 and AP 405-3 and further away from AP 405-2. In contrast, inventory/asset 412 may be determined to be between AP 405-2 and AP 405-3 and further away from AP 405-1. In this example, each of inventory/asset 1 410, inventory/asset 2 411, inventory/asset 3 412, inventory/asset 4 413, and inventory/asset 5 414 may be a shipping container or a parcel configured with a Wi-Fi asset tag as discussed above. Clearly, parcels or shipping containers may not have a direct source of power but may be configured with a Wi-Fi communication STA to provide location and other parameters (e.g., temperature, humidity, etc.) to one or more inventory/asset control devices such as inventory/asset control device 1 420 or inventory/asset control device 2 425. Each of the inventory/asset control devices may be configured to gather information from asset tags (e.g., Wi-Fi STAs) associated with items being tracked and provide information to be presented to a user via an inventory/asset control interface 430.

In addition to a warehouse inventory control system, a similar technique may be implemented to control IT assets (or other items) and track their movements (and operational parameters) within a corporate environment. Specifically, computer systems, printers, and other IT components may be considered assets and a corporation may wish to monitor their locations if they are moved around the enterprise. Clearly, some devices are more prone to relocation than others, but collection of operational parameters for fixed devices may also provide useful information to a corporate enterprise. For example, device usage may be monitored for different IT assets as part of a capacity planning implementation to determine when more (or less) of a particular type of asset may be needed. Other implementations of different types of systems, that may benefit from the disclosed power saving WUR STA communication implementations, are also possible.

Figure 5A:
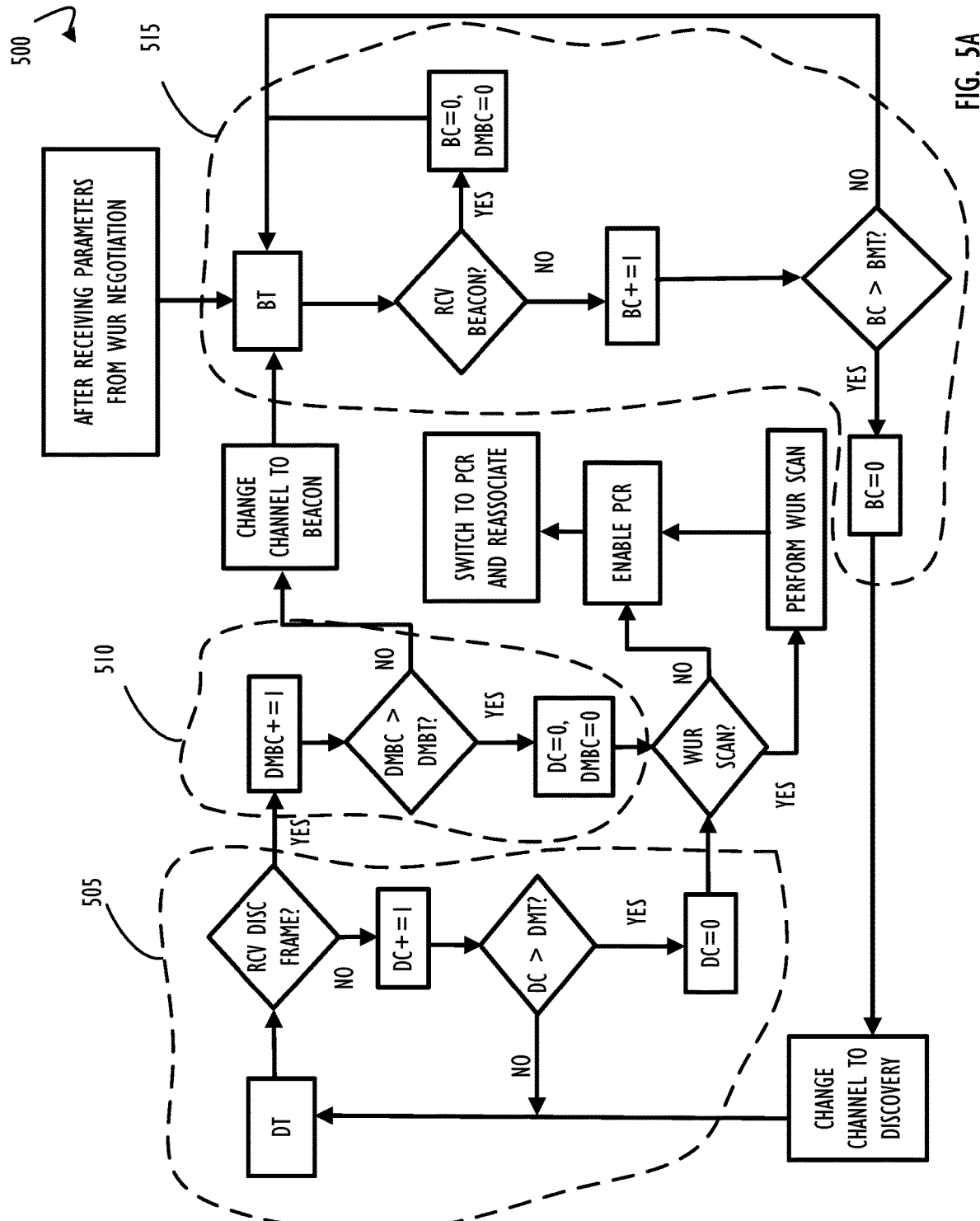
FIGS. 5A-B illustrate a flow chart representing a possible technique (e.g., state machine for client actions) for managing interactions of a WUR and a PCR, for example, to conserve power on a station side device (STA), according to one or more disclosed implementations.

Referring now to FIG. 5A, state machine 500 is illustrated and includes three highlighted portions as indicated by dashed outlines. A first portion of the state machine 500 is Beacon Loop 515, a second portion of state machine 500 is Discovery Loop 505, and a third portion of state machine 500 is portion 510 where a device has missed a determined number of beacons but heard at least one Discovery frame. Each of these portions will be discussed below in the context of the overall discussion for state machine 500.

As mentioned above an AP may send a signal, referred to as a wake-up packet (WUP), to a WUR on a STA device to initiate a wake-up of the PCR for further communication. In disclosed implementations, the WUR may operate in at least two modes. A first of these modes is that the WUR remains on all the time in receive mode. A second of these modes is referred to as a "duty-cycle mode" where the WUR receive operates as on for a certain duration of time and a doze state for the remainder of that duty-cycle.

In addition to receiving and processing WUPs to wake-up the PCR, the WUR also may receive additional packet types that include a Beacon and a Discovery Frame. The Beacon is periodically broadcast from an AP and may be used for TSF at the STA. The Discovery Frame is also periodically sent from an AP and may be used at an STA to discover different BSSs available in a Wi-Fi network. A single AP may send both of these different frames on different 20 MHz channels and with a different broadcast period (e.g., different timing period for different broadcast messages). After a PCR associates to an AP through what is referred to as a "network association," WUR operating parameters may be negotiated through an Action frame exchange that is part of the IEEE 802.11 standard. This process may be referred to as "WUR Negotiation Phase." Parameters negotiated during the WUR Negotiation Phase include but are not limited to, the WID, GID, and duty cycle operation parameters. After negotiating these parameters for the WUR operation, the STA may choose to go to sleep as determined by various operational conditions. While in sleep status, the WUR may operate in either always on or duty-cycle (as discussed above) until the WUR receives a WUP to instruct it to wake-up the PCR.

State machine 500 addresses conditions including but not limited to, how a WUR reacts to missed Beacon Frames; how many Beacon Frames to miss prior to taking action; when the WUR STA should fall back to a discovery channel to receive Discovery Frames; how a WUR STA reacts to missed Discovery Frames; how many Discovery Frames to miss prior to taking action; and when the STA WUR should turn on the PCR to re-associate with the AP. In state machine 500, BT refers to a Beacon Timer for receiving a next Beacon Frame; BC refers to a Beacon Counter for missed Beacon Frames; BMT refers to Beacon Missed Threshold indicating a configurable number or permissible missed beacon frames; DT refers to Discovery Timer as a timer for receiving the next Discovery Frame; DC refers to Discovery Counter as a counter for missed Discovery Frames; DMT refers to a Discovery Missed Threshold indicating a configurable number of permissible missed Discovery Frames; DMBC refers to Discovery Frames (received) but Missed Beacons Counter; and DMBT refers to Discovery Frames (received) but Missed Beacon Threshold as a counter for a number of permissible missed Beacon Frames while receiving Discovery Frames. These last two parameters (DMBC and DMBT) may be used, in part, because Discovery Frames and Beacon Frames may be sent on different channels. Different channels may experience interference (e.g., transmission interference) in contrasting ways and therefore a situation may exist where the WUR STA is receiving Discovery Frames but missing the Beacon Frames.

Figure 5B:
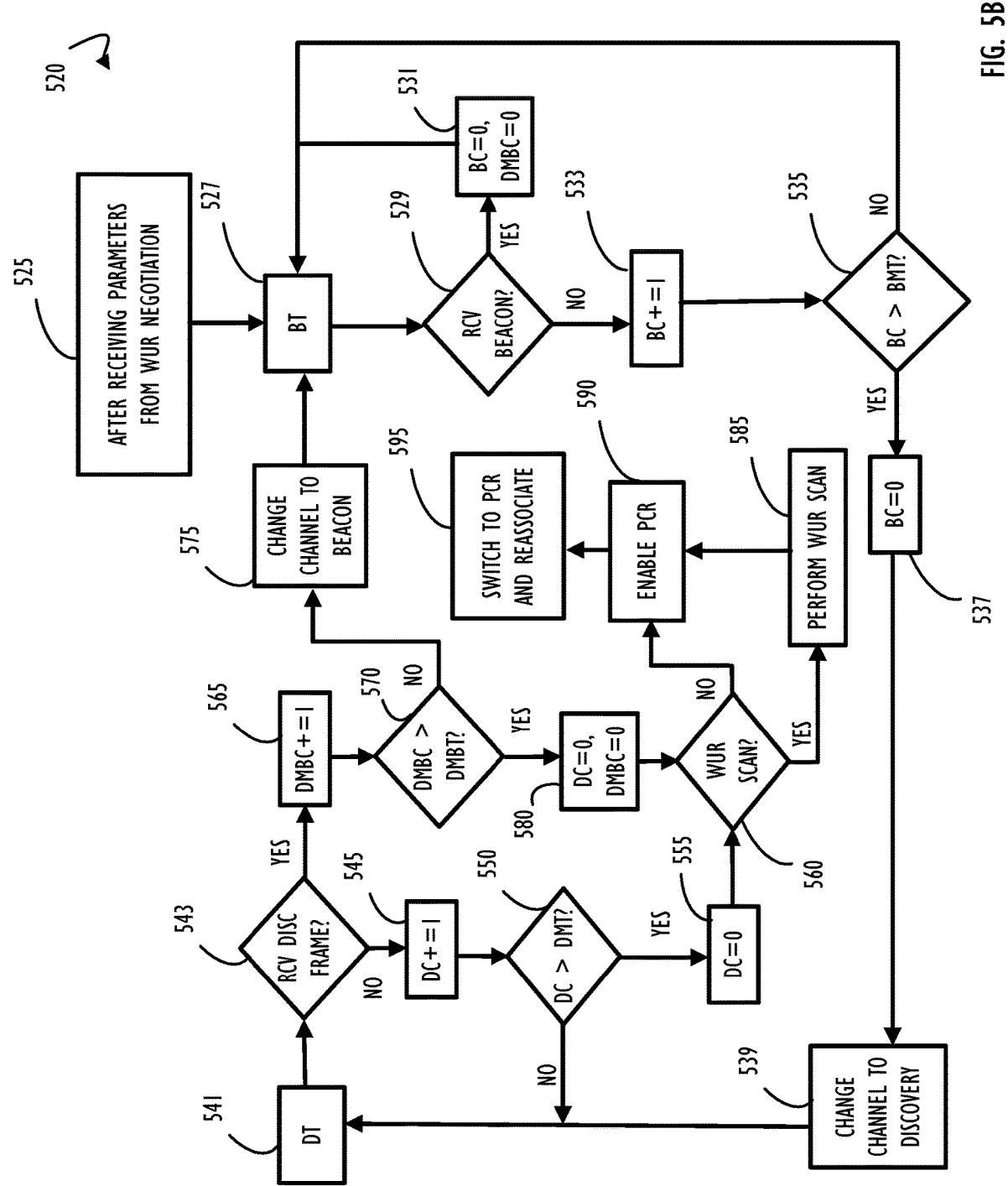

Referring now to FIG. 5B, the following discussion will step through state machine 520 (same as state machine 500 but with element numbers for each state) which was discussed at a high level above and further explain operation of state machine 520 (with reference to parameters defined above in the discussion of FIG. 5A). State machine 520 begins at block 525 where a WUR capable STA has previously completed an IEEE 802.11 association with an AP; and WUR Negotiation Phase has been completed. Block 527 indicates that a Beacon Time may be set to wait for a Beacon Frame. After expiration of the BT at block 527 flow continues to decision 529 to determine if a Beacon Frame has been received. If so, the YES prong of decision 529, flow continues to block 531 where counters may be reset and then returns to block 527 to wait for a next Beacon Frame. If not, the NO prong of decision 529, flow continues to block 533 where BC (Beacon Counter of missed Beacons) may be incremented. Flow then continues to decision 535 where a determination may be made to see if the number of missed Beacons (BC) is greater than a configurable Beacon Missed Threshold (BMT). If not, the NO prong of decision 535, flow returns to block 529 to begin the Beacon Loop (515 from FIG. 5A) again. The Beacon Loop may be useful if an STA device physically roams from one AP to another. If the threshold has been crossed, the YES prong of decision 535, flow continues to block 537 where the Beacon Counter (BC) may be reset to zero. Flow then continues to block 539 to change the channel for a WUR to a discovery channel to look for Discovery Frames. Block 541 represents a Discovery Timer (DT) similar to the BT of block 527 except to wait for Discovery Frames. After expiration of the DT timer at block 541, flow continues to decision 543 to determine if a Discovery Frame has been received. If not, the NO prong of decision 543 where DC (Discovery Counter of missed Discovery Frames) may be incremented. Flow then continues to decision 550 to determine of a configurable threshold of Discovery Frames have been missed (e.g., DC>DMT). If not, the NO prong of decision 550, flow returns to DT 541 to repeat the Discovery Loop 505 of FIG. 5A. However, if the threshold has been crossed indicating that more than the allowed number of Discovery Frames have been missed, flow continues to block 555 where the Discovery Counter (DC) may be reset to zero. Flow then continues to decision 560 where a determination may be made (e.g., by the STA device) whether or not to perform a WUR scan. For example, instead of waking up the main radio, it may be desirable to have the WUR perform a scan over its own Wi-Fi channels to possibly obtain some other Discovery Frames. This may depend on implementation requirements. In some cases, it may not be desirable to wake-up the PCR right away without performing a search on other channels because the AP may have changed channels. If the AP itself has changed channels and went to another operational channel, the STA device may not have been aware of this, in part, because the STA device may have been in deep sleep mode. If a WUR scan is to be performed, the YES prong of decision 560, flow continues to block 585 to perform that scan prior to enabling the PCR at block 590. However, if immediate wakeup of PCR is desired, the NO prong of decision 560, flow continues directly to block 590 to enable the PCR. Finally flow continues to block 595 where the PCR may be activated and attempt to re-associate (e.g., perform a network association in accordance with 802.11) with an AP.

Returning to decision 543, if a Discovery Frame has been received, the YES prong of decision 543, flow enters the third portion of state machine 520 at block 565, represented as portion 510 in FIG. 5A, where a device has missed BMT number of beacons but heard at least one Discovery frame. Block 565 indicates that a DMBC counter may be incremented. Flow then continues to decision 570 to determine if a configurable number of Discovery Frames have been received while missing Beacon Frames. If not, the NO prong of decision 570, flow continues to block 575 where the WUR may change channel to a Beacon channel to search for Beacon Frames again as part of the above mentioned Beacon Loop (515 from FIG. 5A). However, if the DMBT has been exceeded, the YES prong of decision 570, flow continues to block 580 where the DC and DMBC may be reset to zero. Flow then continues to decision 560 to determine if a WUR scan should be performed (as discussed above).

The above examples reference counters with regard to performing certain state transitions. However, an alternate implementation may be based on time rather than counters. For example, rather than counting a number of missed Beacon or Discover packets a timer could be used to ensure receipt of an appropriate type of frame within a determined time period. This implementation would not differ greatly from the above counter mechanism with respect to functionality and efficiency and could be implemented with a different exchange of parameters at WUR negotiation phase. Specifically, During the WUR negotiation phase, the AP may exchange the timing related parameters directly with the STA device. Alternatively, the AP may continue to exchange packet counter related parameters and the STA device may be configured to calculate the time based parameters. Any of the above implementations is possible depending on different design criteria.

Figure 6:
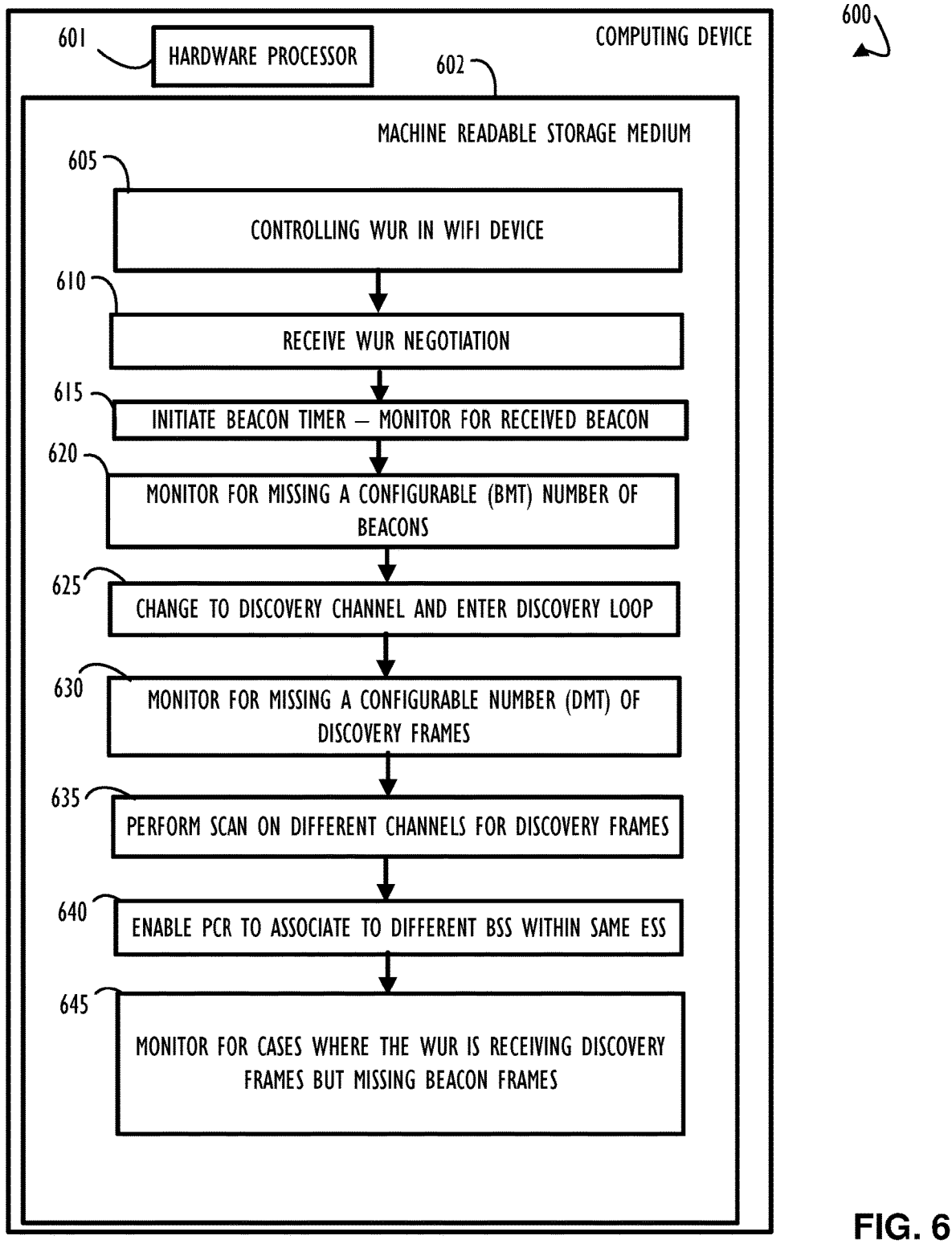
FIG. 6 is a block diagram representing a computing device implementing a technique to manage interaction between a WUR and a PCR on a STA device, according to one or more disclosed implementations.

FIG. 6 is a block diagram representing a computing device 600 implementing a technique to control states of a WUR in a client side device also referred to as a station side STA device, according to one or more disclosed implementations. Computing device 600 includes at least one hardware processor 601 and a machine readable storage medium 602. As illustrated, machine readable medium 602 may store instructions, that when executed by hardware processor 601 (either directly or via emulation/virtualization), cause hardware processor 601 to perform one or more disclosed techniques to control a state machine for a WUR, the instructions stored reflect a method similar to that of FIGS. 5A-B discussed above.

Beginning at block 605, the stored instruction may be directed toward controlling a WUR inside a station side client device configured with both a WUR and a PCR as discussed above. Block 610 indicates that WUR negotiation may have already taken place prior to entering a control mode state machine as disclosed herein. Block 615 indicates that a Beacon timer (a timer waiting for receipt of a Beacon signal) may be initiate to wait for a Beacon signal to be received at the WUR. Block 620 indicates that computing device 600 may monitor for missing a configurable number of Beacon signals (e.g., Beacon frames) prior to transitioning to a next phase of a state machine. For example, there may be a timer to determine if a Beacon frame was expected to be received or a certain number of other actions may take place without receipt of an expected number of Beacon frames. Block 625 indicates if the Beacon signals have been determined to be missed, the WUR may be changed to a Discovery channel to monitor for Discovery frames in a discovery loop portion of a state machine. Block 630 indicates that the device may monitor for a configurable number of Discovery frames. Block 635 indicates that a WUR may be instructed by hardware processor 601 to scan on different channels for Discovery frames. Block 640 indicates that a determination may be made as to if the PCR should be enabled to associate to a different BSS within the same ESS. Block 645 indicates that the device may monitor for cases where the WUR is receiving Discovery frames but missing Beacon frames and address that situation according to the state machine of FIG. 5B, for example.

Figure 7:
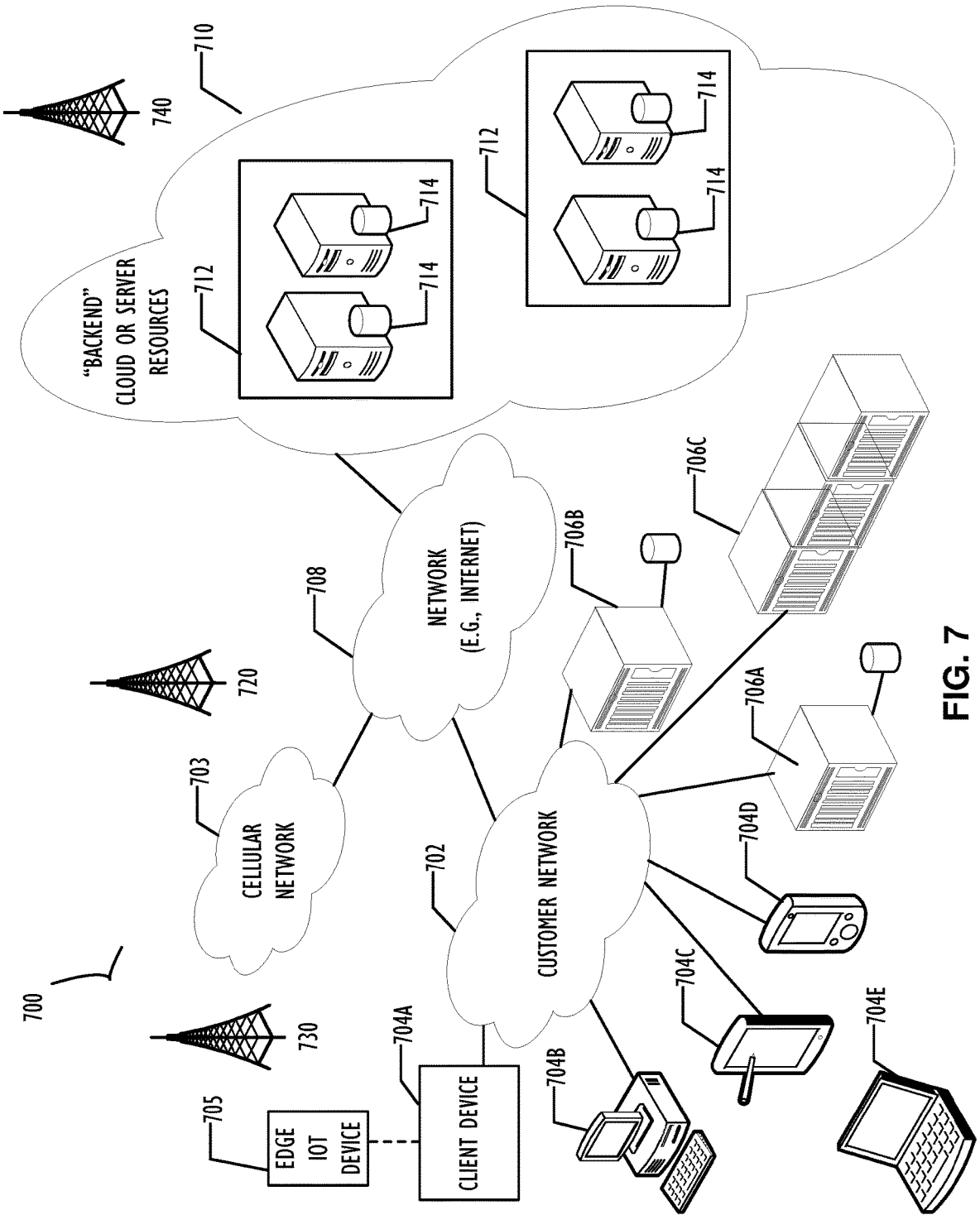
FIG. 7 represents a computer network infrastructure that may be used to implement all, or part of the disclosed WUR computer processing associated with determining when to initiate communication via a PCR of an STA device, according to one or more disclosed implementations.

FIG. 7 represents a computer network infrastructure that may be used to implement all, or part of the disclosed techniques for interacting with a WIFI network by a client station side device, according to one or more disclosed implementations. Network infrastructure 700 includes a set of networks where implementations of the present disclosure may operate, including the disclosed inventory/asset tagging and smart home device implementations. For example, there may be multiple nodes of different networks at different locations (e.g., data centers, warehouses, corporate enterprises) and those data centers may communicate with each other (and with STA devices) through network infrastructure 700. Devices may roam about geographically and connect with network infrastructure 700 at different locations (e.g., via different APs not shown). Network infrastructure 700 comprises a customer network 702, network 708, cellular network 703, and a cloud service provider network 710. Any of these networks may have nodes providing or receiving information in accordance with this disclosure. That is, each of these different networks may include one or more APs that may connect to one or more WUR enabled devices that may benefit from the concepts of this disclosure. In one implementation, the customer network 702 may be a local private network, such as local area network (LAN) that includes a variety of network devices that include, but are not limited to switches, servers, and routers.

Each of these networks can contain wired or wireless programmable devices and operate using any number of network protocols (e.g., TCP/IP) and connection technologies (e.g., WiFi® networks, or Bluetooth®. In another implementation, customer network 702 represents an enterprise network that could include or be communicatively coupled to one or more local area networks (LANs), virtual networks, data centers and/or other remote networks (e.g., 708, 710). In the context of the present disclosure, customer network 702 may include one or more high-availability data stores (e.g., quorum data store), switches, or network devices using methods and techniques such as those described above.

As shown in FIG. 7, customer network 702 may be connected to one or more client devices 704A-E and allow the client devices 704A-E to communicate with each other and/or with cloud service provider network 710, via network 708 (e.g., Internet). Client devices 704A-E may be computing systems such as desktop computer 704B, tablet computer 704C, mobile phone 704D, laptop computer (shown as wireless) 704E, and/or other types of computing systems generically shown as client device 704A. In this context, client devices should not be confused with a client application of a server-based application (or distributed application) because they represent devices in a client-server architecture rather than applications. However, while it is true that client devices may often run client applications, there are situations where a client device will execute the server side of a client-server application such that the client device communicates with a server device (e.g., executing the client application) to request remote execution on behalf of the client device. That is, the client device may execute a server application portion with the server device executing the client application portion for a given client-server application architecture. In general, the client portion of an application is the portion that requests some work and receives the results of the work, with the server portion receiving the request for work, performing that work, and providing the results.

Network infrastructure 700 may also include other types of devices generally referred to as Internet of Things (IoT) devices (e.g., edge IOT device 705) that may be configured to send and receive information via a network to access cloud computing services or interact with a remote web browser application (e.g., to receive configuration information).

FIG. 7 also illustrates that customer network 702 includes local compute resources 706A-C that may include a server (e.g., a data storage server, application server, web server), access point, router, or other device configured to provide for local computational resources and/or facilitate communication amongst networks and devices. For example, local compute resources 706A-C may be one or more physical local hardware devices to support an asset or inventory control capability as outlined above. Local compute resources 706A-C may also facilitate communication between other external applications, data sources (e.g., 707A and 707B), and services, and customer network 702.

Network infrastructure 700 also includes cellular network 703 for use with mobile communication devices. Mobile cellular networks support mobile phones and many other types of mobile devices such as laptops etc. Mobile devices in network infrastructure 700 are illustrated as mobile phone 704D, laptop computer 704E, and tablet computer 704C. A mobile device such as mobile phone 704D may interact with one or more mobile provider networks as the mobile device moves, typically interacting with a plurality of mobile network towers 720, 730, and 740 for connecting to the cellular network 703.

FIG. 7 illustrates that customer network 702 is coupled to a network 708. Network 708 may include one or more computing networks available today, such as other LANs, wide area networks (WAN), the Internet, and/or other remote networks, in order to transfer data between client devices 704A-D and cloud service provider network 710. Each of the computing networks within network 708 may contain wired and/or wireless programmable devices that operate in the electrical and/or optical domain.

In FIG. 7, cloud service provider network 710 is illustrated as a remote network (e.g., a cloud network) that is able to communicate with client devices 704A-E via customer network 702 and network 708. The cloud service provider network 710 acts as a platform that provides additional computing resources to the client devices 704A-E and/or customer network 702. In one implementation, cloud service provider network 710 includes one or more data centers 712 with one or more server instances 714. Cloud service provider network 710 may also include one or more rack-mounted blade servers or frames representing a scalable compute resource that may interface with STA client devices incorporating benefits from the techniques of this disclosure.

Figure 8:
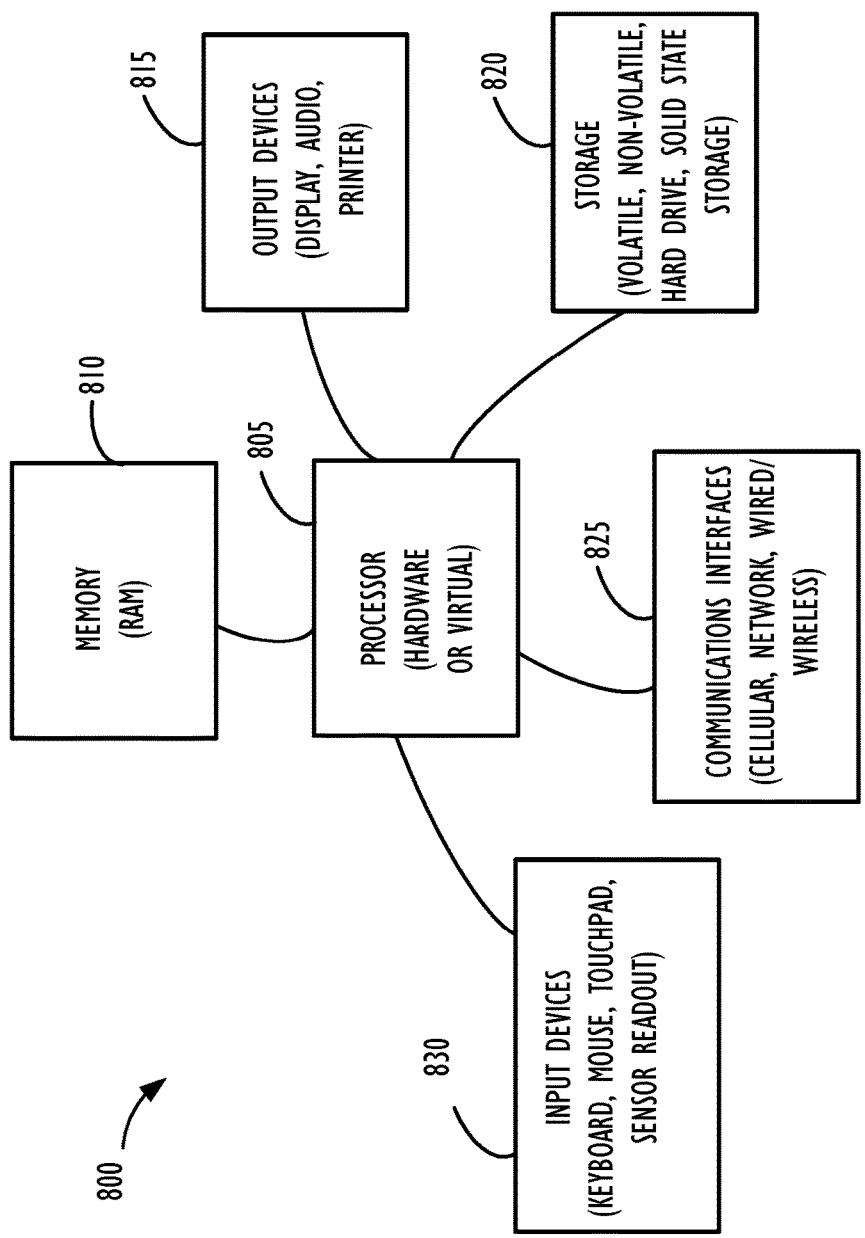
FIG. 8 illustrates a computer processing device that may be used to implement the functions, modules, processing platforms, execution platforms, communication devices, and other methods and processes of this disclosure.

FIG. 8 illustrates a computing device 800 that may be used to implement or be used with the functions, modules, processing platforms, execution platforms, communication devices, and other methods and processes of this disclosure. For example, computing device 800 illustrated in FIG. 8 could represent a client device or a physical server device as illustrated in any of FIGS. 1-4, and 6-7, and include either hardware or virtual processor(s) depending on the level of abstraction of the computing device. Specifically, each of nodes, network communication devices, hosts, or compute resources discussed above may be considered instances of a computing device similar to computing device 800. Accordingly, multiple instances of computing device 800 and processor 805 may be used to implement the above disclosed methods (e.g., state diagram 500 of FIG. 5) and systems for asset or inventory control. In some instances (without abstraction), computing device 800 and its elements, as shown in FIG. 8, each relate to physical hardware. Alternatively, in some instances one, more, or all of the elements could be implemented using emulators or virtual machines as levels of abstraction. In any case, no matter how many levels of abstraction away from the physical hardware, computing device 800 at its lowest level may be implemented on physical hardware.

As also shown in FIG. 8, computing device 800 may include one or more input devices 830, such as a keyboard, mouse, touchpad, or sensor readout (e.g., biometric scanner) and one or more output devices 815, such as displays, speakers for audio, or printers. Some devices may be configured as input/output devices also (e.g., a network interface or touchscreen display).

Computing device 800 may also include communications interfaces 825, such as a network communication unit that could include a wired communication component and/or a wireless communications component similar to that illustrated in wireless station (STA) 210 of FIG. 2, which may be communicatively coupled to processor 805. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 8, computing device 800 includes a processing element such as processor 805 that contains one or more hardware processors, where each hardware processor may have a single or multiple processor cores. In one implementation, the processor 805 may include at least one shared cache that stores data (e.g., computing instructions) that are utilized by one or more other components of processor 805. For example, the shared cache may be a locally cached data stored in a memory for faster access by components of the processing elements that make up processor 805. In one or more implementations, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) and a microprocessor. Although not illustrated in FIG. 8, the processing elements that make up processor 805 may also include one or more of other types of hardware processing components, such as graphics processing units (GPU), application specific integrated circuits (ASICs), field-programmable gate arrays (FPGAs), and/or digital signal processors (DSPs).

FIG. 8 illustrates that memory 810 may be operatively and communicatively coupled to processor 805. Memory 810 may be a non-transitory medium configured to store various types of data. For example, memory 810 may include one or more storage devices 820 that comprise a non-volatile storage device and/or volatile memory. Volatile memory, such as random-access memory (RAM), can be any suitable non-permanent storage device. The non-volatile storage devices 820 can include one or more disk drives, optical drives, solid-state drives (SSDs), tap drives, flash memory, read only memory (ROM), and/or any other type of memory designed to maintain data for a duration of time after a power loss or shut down operation. In certain instances, the non-volatile storage devices 820 may be used to store overflow data if allocated RAM is not large enough to hold all working data. The non-volatile storage devices 820 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 805. In one implementation, the compiling process of the software program may transform program code written in a programming language to another computer language such that the processor 805 is able to execute the programming code. For example, the compiling process of the software program may generate an executable program that provides encoded instructions (e.g., machine code instructions) for processor 805 to accomplish specific, non-generic, particular computing functions.

After the compiling process, the encoded instructions may then be loaded as computer executable instructions or process steps to processor 805 from storage device 820, from memory 810, and/or embedded within processor 805 (e.g., via a cache or on-board ROM). Processor 805 may be configured to execute the stored instructions or process steps in order to perform instructions or process steps to transform the computing device into a non-generic, particular, specially programmed machine or apparatus. Stored data, e.g., data stored by a storage device 820, may be accessed by processor 805 during the execution of computer executable instructions or process steps to instruct one or more components within the computing device 800.

A user interface (e.g., output devices 815 and input devices 830) can include a display, positional input device (such as a mouse, touchpad, touchscreen, or the like), keyboard, or other forms of user input and output devices. The user interface components may be communicatively coupled to processor 805. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 800 may comprise other components well known in the art, such as sensors, powers sources, and/or analog-to-digital converters, not explicitly shown in FIG. 8.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A computer-implemented method of controlling a wake-up radio (WUR) in a wireless station side client device, the method comprising:
    switching wireless network communication for a wireless station side client device from a primary communication radio (PCR) to a WUR;
    initiating a beacon loop to detect if a beacon frame has not been received at the WUR within a first duration of the beacon loop;
    exiting the beacon loop responsive to exceeding the first duration to enter a discovery loop;
    processing the discovery loop to detect if a discovery frame has not been received at the WUR within a second duration of the discovery loop;
    exiting the discovery loop responsive to exceeding the second duration or receiving a discovery frame; and
    switching wireless network communication for the wireless station side client device from the WUR to the PCR.

2. The computer-implemented method of claim 1, wherein the first duration is determined by a beacon timer (BT) and repeating monitoring for beacon frames until a count of missed consecutive beacon frames exceeds a beacon missed threshold.

3. The computer-implemented method of claim 1, wherein the second duration is determined by a discovery timer (DT) and repeating monitoring for discovery frames until a count of missed consecutive discovery frames exceeds a discovery missed threshold.

4. The computer-implemented method of claim 1, wherein the first duration is determined by a time period calculated based on a configurable number of missed beacon frames multiplied by an expected interval between beacon frames.

5. The computer-implemented method of claim 4, wherein parameters to determine the first duration are included as part of a negotiation phase that includes exchange of negotiation parameters from a wireless access point (AP), the negotiation parameters including parameters sufficient to establish a wireless association as a network connection for wireless network communication between the wireless station side client device and the AP.

6. The computer-implemented method of claim 1, further comprising:
    changing the channel monitored by the WUR as part of exiting the beacon loop and entering the discovery loop.

7. The computer-implemented method of claim 1, further comprising:
exiting the discovery loop responsive to receiving a discovery frame; and
changing the channel monitored by the WUR to a beacon monitoring channel prior to re-entering the beacon loop.

8. The computer-implemented method of claim 1, further comprising:
reassociating a network connection for wireless network communication between the wireless station side client device and the AP after switching wireless network communication for the wireless station side client device from the WUR to the PCR.

9. A computer device, comprising:
a hardware processor;
a wireless network interface communicatively coupled to the hardware processor;
a wake-up radio (WUR) communicatively coupled to the hardware processor;
a primary communication radio (PCR) communicatively coupled to the hardware processor and the wireless network interface; and
an instruction memory area communicatively coupled to the hardware processor, wherein the instruction memory area stores instructions, that when executed by the hardware processor, cause the hardware processor to:
switch wireless network communication for the computer device from the PCR to the WUR;
initiate a beacon loop to detect if a beacon frame has not been received at the WUR within a first duration of the beacon loop;
exit the beacon loop responsive to exceeding the first duration to enter a discovery loop;
process the discovery loop to detect if a discovery frame has not been received at the WUR within a second duration of the discovery loop;
exit the discovery loop responsive to exceeding the second duration or receiving a discovery frame; and
switch wireless network communication for the computer device from the WUR to the PCR.

10. The computer device of claim 9, wherein the first duration is determined by a beacon timer (BT) and repeating monitoring for beacon frames until a count of missed consecutive beacon frames exceeds a beacon missed threshold.

11. The computer device of claim 9, wherein the second duration is determined by a discovery timer (DT) and repeating monitoring for discovery frames until a count of missed consecutive discovery frames exceeds a discovery missed threshold.

12. The computer device of claim 9, wherein the first duration is determined by a time period calculated based on a configurable number of missed beacon frames multiplied by an expected interval between beacon frames.

13. The computer device of claim 12, wherein parameters to determine the first duration are included as part of a negotiation phase that includes exchange of negotiation parameters from a wireless access point (AP), the negotiation parameters including parameters sufficient to establish a wireless association as a network connection for wireless network communication between the wireless station side client device and the AP.

14. The computer device of claim 9, wherein the instruction memory area further comprises instructions, that when executed by the hardware processor, cause the hardware processor to:
change the channel monitored by the WUR as part of exiting the beacon loop and entering the discovery loop.

15. The computer device of claim 9, wherein the instruction memory area further comprises instructions, that when executed by the hardware processor, cause the hardware processor to:
exit the discovery loop responsive to receiving a discovery frame; and
change the channel monitored by the WUR to a beacon monitoring channel prior to re-entering the beacon loop.

16. The computer device of claim 9, wherein the instruction memory area further comprises instructions, that when executed by the hardware processor, cause the hardware processor to:
reassociate a network connection for wireless network communication between the computer device and the AP after switching wireless network communication for the computer device from the WUR to the PCR.

17. A non-transitory computer readable medium comprising computer executable instructions stored thereon that when executed by one or more hardware processors, cause the one or more hardware processors to:
switch wireless network communication for a device from a primary communication radio (PCR) to a wake-up radio (WUR);
initiate a beacon loop to detect if a beacon frame has not been received at the WUR within a first duration of the beacon loop;
exit the beacon loop responsive to exceeding the first duration to enter a discovery loop;
process the discovery loop to detect if a discovery frame has not been received at the WUR within a second duration of the discovery loop;
exit the discovery loop responsive to exceeding the second duration or receiving a discovery frame; and
switch wireless network communication for the device from the WUR to the PCR.

18. The non-transitory computer readable medium of claim 17, wherein the computer executable instructions further comprise instructions to cause the one or more hardware processors to:
reassociate the network connection for wireless network communication between the computer device and the AP after switching wireless network communication for the computer device from the WUR to the PCR.

19. The non-transitory computer readable medium of claim 17, wherein the first duration is determined by a time period calculated based on a configurable number of missed beacon frames multiplied by an expected interval between beacon frames.

20. The non-transitory computer readable medium of claim 19, wherein parameters to determine the first duration are included as part of a negotiation phase that includes exchange of negotiation parameters related to establishing a wireless network association of the device with a wireless access point (AP).

* * * * *